United States Patent

Zaweski et al.

[11] Patent Number: 5,180,510
[45] Date of Patent: Jan. 19, 1993

[54] ANTIOXIDANT ADDITIVE AND LUBRICATING OIL CONTAINING SAME

[75] Inventors: Edward F. Zaweski; Scott A. Culley, both of Baton Rouge, La.

[73] Assignee: Ethyl Petroleum Additives, Inc., Richmond, Va.

[21] Appl. No.: 175,522

[22] Filed: Mar. 31, 1988

[51] Int. Cl.$^5$ ................ C10M 135/00; C10M 133/00
[52] U.S. Cl. .................... 252/47; 252/47.5; 252/402
[58] Field of Search .......... 252/47, 47.5, 402; 558/235, 236, 237

[56] References Cited

U.S. PATENT DOCUMENTS

| | | | |
|---|---|---|---|
| 2,609,389 | 9/1952 | Flenner | 260/500 |
| 2,719,827 | 10/1955 | Lowe | 252/47 |
| 3,579,516 | 5/1971 | Albert | 558/237 |
| 3,833,496 | 9/1974 | Malec | 252/47.5 |
| 3,853,775 | 12/1974 | Williams | 252/47 |
| 3,876,550 | 4/1975 | Holubec | 252/47.5 |
| 4,204,969 | 5/1980 | Papay et al. | 252/45 |
| 4,207,196 | 6/1980 | Sudekum | 252/47.5 |
| 4,501,678 | 2/1985 | Katayama et al. | 252/47.5 |
| 4,618,461 | 10/1986 | Bergman et al. | 558/237 |
| 4,740,322 | 4/1988 | DiBiase et al. | 252/47.5 |
| 4,758,362 | 7/1988 | Butke | 252/47 |

FOREIGN PATENT DOCUMENTS 1296322 11/1972 United Kingdom ............... 558/237

Primary Examiner—Ellen McAvoy
Attorney, Agent, or Firm—David M. Bunnell

[57] ABSTRACT

An additive for improving the antioxidation properties of lubricating oil is made by reacting a sulfur halide selected from sulfur monochloride or sulfur dichloride with an aliphatic monoolefin (e.g. isobutene) to form an adduct, reacting the adduct thus formed with an alkali metal salt of an organocarbamodithioic acid in an aqueous alkanol medium and recovering the reaction product.

When added to lubricating oil, the additive products of the invention improve the antioxidation properties of the lubricating oil.

3 Claims, No Drawings

ANTIOXIDANT ADDITIVE AND LUBRICATING OIL CONTAINING SAME

BACKGROUND OF THE INVENTION

This invention relates to an improved lubricating oil composition, and more particularly, this invention relates to a lubricating oil composition containing an additive having improved antioxidation properties.

Additives are conventionally added to lubricating oils, cutting oils and the like to improve their antioxidation properties. Several oxidation inhibitors have been developed in the past and are used in almost all of the mineral and synthetic oils today. Typical of these inhibitors are sulfurized oil-soluble organic compounds, such as wax sulfides and polysulfides, sulfurized olefins, sulfurized fatty acid esters, and sulfurized olefin esters, as well as zinc dithiophosphates and oil-soluble phenolic and aromatic amine antioxidants.

SUMMARY OF THE INVENTION

According to the present invention, there is provided a lubricating oil additive which is soluble in both mineral and synthetic oils of lubricating viscosity and imparts improved antioxidant properties to such oils. The additive is obtained by reacting a sulfur halide selected from sulfur monochloride or sulfur dichloride with an aliphatic monoolefin (e.g. isobutene) to form an adduct which is reacted with an alkali metal salt of an organocarbamodithioic acid in an aqueous alkanol medium.

The organocarbamodithioic acid, alkali metal salt reactants of the present invention hereinafter also are referred to hereinafter as alkali metal organodithiocarbamates, can be represented by the formula:

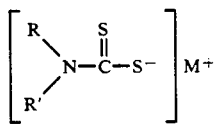

wherein R is an organic radical, e.g. an alkyl group, an alkenyl group, an aryl group, or an aralkyl group. The alkyl or alkenyl groups can contain up to 32 carbon atoms, preferably up to 12 carbon atoms, and the aryl or aralkyl groups, which include a benzene or a naphthalene nucleus substituted by alkyl radicals or aryl or aralkyl radicals, preferably contain up to 15 carbon atoms. The alkyl or alkenyl groups can be acyclic and of straight chain or branched structure, or they can be alicyclic. The R group may be interrupted by a hetero atom linkage, such as O or S, and may contain one or more primary or secondary amino groups. In the foregoing formula, R' can be hydrogen, but it may be an alkyl, alkenyl, aryl or aralkyl group, as defined for R and may be the same as R or it may be different from R in a given compound. When R and R' are alkyl groups, they may be joined together to form a heterocyclic link with the nitrogen atom to which they are attached. R and R' may also be substituted by non-interfering groups such as alkoxy, halo and amido groups, and the like. M is a Group IA alkali metal, preferably lithium, sodium or potassium.

DESCRIPTION OF THE PREFERRED EMBODIMENTS

Thus, one embodiment of the invention is a lubricating oil additive which imparts improved antioxidant properties made by the process of (i) reacting a sulfur halide selected from sulfur monochloride or sulfur dichloride with an aliphatic monoolefin to produce an adduct, (ii) reacting said adduct in an aqueous alkanol medium with an alkali metal salt of an organocarbamodithioic acid having the formula:

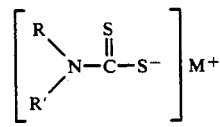

wherein R is an organic radical selected from an alkyl group, an alkenyl group, an aryl group or an aralkyl group in which the alkyl and alkenyl groups contain up to 32 carbon atoms and the aryl or aralkyl groups contain up to 15 carbon atoms each and R' is hydrogen or an organic radical selected from an alkyl group, an alkenyl group, an aryl group or an aralkyl group in which the alkyl or alkenyl groups contain up to 32 carbon atoms and the aryl and aralkyl groups contain up to 15 carbon atoms each, and (iii) recovering said additive.

In another embodiment of the invention there is provided a lubricating oil composition comprising an oil of lubricating viscosity and an antioxidant amount of an additive made by the process of (i) reacting a sulfur halide selected from sulfur monochloride or sulfur dichloride with an aliphatic monoolefin to produce an adduct, (ii) reacting said adduct in an aqueous alkanol medium with an alkali metal salt of an organocarbamodithioic acid having the formula:

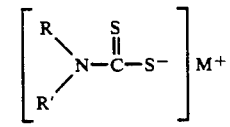

wherein R is an organic radical selected from an alkyl group, an alkenyl group, an aryl group or an aralkyl group in which the alkyl and alkenyl groups contain up to 32 carbon atoms and the aryl or aralkyl groups contain up to 15 carbon atoms each and R' is hydrogen or an organic radical selected from an alkyl group, an alkenyl group, an aryl group or an aralkyl group in which the alkyl or alkenyl groups contain up to 32 carbon atoms and the aryl and aralkyl groups contain up to 15 carbon atoms each, and (iii) recovering said additive.

Useful olefins are the monoethylenically unsaturated aliphatic hydrocarbons referred to as aliphatic monoolefins containing three to six carbon atoms. These include 1-butene, 2-butene, isobutene, 1-pentene, 2-pentene, 2-methyl-1-butene, 3-methyl-1-butene, 2-methyl-2-butene, 1-hexene, 2-hexene, 3-hexene, 2-methyl-1-pentene, 2-methyl-2-pentene, 2-ethyl-2-butene and the like including mixtures thereof.

Preferably, the olefins are branched-chain olefins such as isobutene, 2-methyl-1-butene, 2-methyl-2-butene, 2-methyl-2-pentene and the like. More preferably, the ethylenic double bond adjoins a tertiary carbon atom such as isobutylene, the most preferred olefin.

The first stage reaction is preferably conducted by adding the olefin to the sulfur halide. The olefin can be added as a gas or a liquid. Preferably, it is added beneath the surface of the sulfur halide as a liquid.

In practice, the olefin is added until the reaction with the sulfur halide stops as indicated by loss of exotherm. An amount of about 0.45-1.5 gram moles of olefin for each 0.3-0.75 gram mole of sulfur halide usually suffices. A preferred amount is about 1.7-2.0 gram moles of olefin per gram mole of sulfur halide.

Although useful products can be obtained using either sulfur monochloride or sulfur dichloride, sulfur monochloride is the preferred sulfur halide.

The first stage reaction can be conducted at any temperature high enough to cause the reaction to proceed, but not so high as to cause decomposition of the reactants or products. A useful range is about 30°-100° C. A more preferred range is about 40°-75° C. and a most preferred range is about 50 -60° C.

The first stage reaction should be conducted for a time sufficient to complete the reaction between the sulfur halide and olefin. This is usually limited by heat removal. Olefin feed rate is preferably controlled to hold the temperature within the desired range. When the sulfur halide has been consumed, the temperature will drop. External heat may be added to continue the reaction for a further time, but this does not appear to be necessary. The overall time required to complete the reaction depends upon the scale of the process and can vary from a few minutes up to twelve or more hours. However, the time of reaction is not critical.

During the first stage, HCl gas is evolved so means should be provided to scrub the vent gas from the reactor to remove HCl prior to releasing it to the atmosphere.

Optionally, the reaction of the olefin and sulfur halide can be carried out in the presence of minor amounts of an active Lewis acid. The Lewis acid can be added to the sulfur halide initially, added to the reaction mixture continuously or periodically during the course of the olefin addition, or it can be mixed with the olefin and added together with the olefin. The preferred mode of addition is to add the entire amount initially to the sulfur halide and then add the olefin.

The utilization of certain Lewis acids in the preparation of the adducts of the present invention appear to produce adducts which, after reaction with the alkali metal organodithiocarbamate component of the invention, afford lubricant additives having improved solubility in synthetic oils of the polyalphaolefin type in addition to being sufficiently soluble in other synthetic oils as well as mineral oils to function as antioxidant additives in such oils. The term active Lewis acid therefore refers to any Lewis acid or electron acceptor which, when utilized in accordance with the teachings set forth herein, produces such additives. Examples of Lewis acids which can be used in the production of the adducts of the invention include aluminum bromide, aluminum fluoride, boron trifluoride, boron trichloride, stannic chloride, titanium tetrachloride, ferric chloride, ferric bromide, aluminum chloride and the like. Ferric chloride is the preferred Lewis acid used in the preparation of the adducts of the invention when utilization of a Lewis acid is desired.

The amount of Lewis acid used is an amount which will produce additive products of sufficient solubility in polyalphaolefin synthetic oils that they can be used in such oils, in addition to other synthetic and mineral oils, as effective antioxidants. The amount may vary with the specific Lewis acid used. The amount required can be readily determined experimentally by adding the particular Lewis acid selected for use in the preparation of the adduct to the reaction mixture of sulfur halide and monoolefin, until an adduct is produced, which, as indicated previously, after reaction with the alkali metal organodithiocarbamate component of the invention affords an additive possessing the desired solubility in polyalphaolefin oils as well as other synthetic and mineral oils.

In general, minor amounts which can vary from about 0.025 percent to about 5.0 percent by weight of Lewis acid based on the weight of sulfur halide are used in the invention. A preferred amount is from about 0.05 percent to about 3.0 percent by weight. A most preferred amount is about 0.1 percent by weight.

In the second stage reaction, adduct from the first stage is reacted with the alkali metal organodithiocarbamate reactant of the invention in an aqueous alkanol reaction medium. Preferably, the second stage is carried out by charging the adduct formed in the first stage of the reaction to an aqueous alkanol solution of the alkali metal organodithiocarbamate prepared as described below.

As stated above, the alkali metal organodithiocarbamate reactants of the present invention can be represented by the formula:

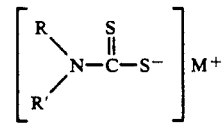

wherein R is an organic radical, e.g. an alkyl group, and alkenyl group, an aryl group, or an aralkyl group. The alkyl or alkenyl groups can contain up to 32 carbon atoms, preferably up to 12 carbon atoms, and the aryl or aralkyl groups, which include a benzene or a naphthalene nucleus substituted by alkyl radicals or aryl or aralkyl radicals, preferably contain up to 15 carbon atoms each. The alkyl or alkenyl groups can be acyclic and of straight chain or branched structure, or they may be alicyclic. The R group may be interrupted by a hetero atom linkage, such as O or S, and may contain one or more primary or secondary amino groups. In the foregoing formula, R' can be hydrogen, but it may be an alkyl, alkenyl, aryl or aralkyl group, as defined for R, and may be the same as R or it may be different from R in a given compound. When R and R' are alkyl groups, they may be joined together to form a heterocyclic link with the nitrogen atom to which they are attached. R and R' may also be substituted by non-interfering groups such as alkoxy, halo and amido groups, and the like. M is a Group IA alkali metal, preferably lithium, sodium or potassium.

The alkali metal organodithiocarbamate reactants of the invention are known compounds as are methods for their preparation. For example, water-soluble alkali metal salts of organodithiocarbamic acid such as sodium dimethyldithiocarbamate can be made by the addition of carbon disulfide to dimethylamine and a strong base. That is, carbon disulfide is added gradually with mixing to a solution of an amine and a strong base in an inert solvent.

Amines suitable for use in preparing the organocarbamodithioic acid, alkali metal salts of the invention can be both primary or secondary amines, i.e. compounds having one or more primary or secondary amino groups, preferably primary and secondary monoamines of the general formula:

R—NH—R' wherein R and R' are as defined above.

Specific illustrative examples of the amines contemplated for use herein include methylamine, ethylamine, propylamine, isopropylamine, n-butylamine, sec-butylamine, isobutylamine, pentylamine, hexylamine, cyclohexylamine, heptylamine, octylamine, dodecylamine, octadecylamine, eicosylamine, triacontanylamine, benzylamine, chlorobenzylamine, nitrobenzylamine, 2-ethoxyethylamine, 4-carbomethoxyhexylamine, dimethylamine, diethylamine, di-n-propylamine, diisopropylamine, di-n-butylamine, di-sec-butylamine, diisobutylamine, di-tert-butylamine, dipentylamine, dihexylamine, dioctylamine, dieicosylamine, ditriacontanylamine, N-methylethylamine, N-methylpropylamine, N-methyloctadecylamine, N-ethylhexylamine, N-ethyldodecylamine, N-propyldodecylamine, aniline, toluidine (o-, m-, or p-), 2,4-xylidine, 3,4-xylidine, 2,5-xylidine, 4-ethylaniline, 3-propylaniline, 1,3-diamino benzene, 4,4'-diamino-diphenyl methane, p-chloro aniline, 2,6-diamino toluene, 4,4'-diaminodiphenyl, 2,4,4'-triamino diphenyl ether, 2,6-diamino naphthalene, 1,5-diamino-2-methylpentane, phenylethyl amine, piperidine, morpholine, piperazine, glycine, 2-amino ethyl ether, 2-amino ethyl sulfide, and the like. The preferred amino compounds are lower alkyl secondary amines wherein each of R and R' as described above have up to about 12 carbon atoms.

The strong bases suitable for use in preparing the alkali metal organodithiocarbamate reactants of the invention are those having a basic (hydroxyl ion) disassociation constant greater than that of the organocarbamodithioic acid used, excluding, of course, those bases which are reactive with carbon disulfide such as ammonia and amines having an active hydrogen ion attached to the amine nitrogen. Typical, suitable strong bases are the inorganic alkali metal hydroxides such as sodium, lithium and potassium hydroxides.

The process is preferably carried out in the presence of an inert solvent for the amine reactant. Water is the preferred solvent, but other solvents such as methanol, ethanol and isopropanol also may be used. The solvent should be used in an amount sufficient to maintain the reacting mass in a fluid, easily stirred form throughout the process.

In carrying out the process, it is preferred to use one mole of carbon disulfide for each mole of amine although a slight excess of carbon disulfide may be used, if desired. Typically, one mole of base for each mole of amine is used in the process.

It is convenient to start with an aqueous solution of the amine containing from about 5-50% by weight of the amine, to add the strong base in the form of an aqueous solution containing 10-60% by weight of the base and then to add about 1 mole of carbon disulfide to the solution. Addition of the base to the aqueous solution of amine is typically carried out at a temperature not in excess of about 50.C. and, more typically, in the range of about 5° to 50° C. Prior to addition of carbon disulfide to the reaction mixture, the aqueous amine and base solution is cooled to about 3° to 4° C. by means of an ice bath in order to prevent loss of the amine reactant due to volatilization.

As stated previously, the second stage reaction is carried out by charging the adduct formed by the reaction of the sulfur halide and olefin reactants to an aqueous alkanol solution of the alkali metal organodithiocarbamate. Alternatively, the reaction can be carried out in other ways such as by adding the adduct and an aqueous alkanol mixture to the alkali metal organodithiocarbamate reactant or by adding the alkali metal organodithiocarbamate and an aqueous alkanol mixture to the adduct or by simultaneously mixing everything together and heating the mixture.

The amount of adduct can vary somewhat. For example, from about 0.1 to 0.6 mole for each 1 mole of alkali metal organodithiocarbamate used in the second reaction stage. Preferably, the amount of adduct is about 0.4 to 0.5 mole per 1 mole of alkali metal organodithiocarbamate.

As indicated previously, water and alcohol are required in the second stage.

The amount of water can vary widely without detrimental effect. Good results can be obtained using about 0.25 to 100 grams of water per 1.0 gram of adduct. This includes water added as such and water in aqueous reactants.

Preferred alcohols used in the second stage reaction are lower alkanols containing 1-4 carbon atoms such as methanol, ethanol, n-propanol, n-butanol, isobutanol, tert-butanol and the like, including mixtures thereof. Most preferred alkanols are ethanol and isopropanol.

The amount of alkanol can likewise vary over a wide range. A useful range is about 0.5 to 2.0 parts by weight per each part by weight of water. A more preferred range is about 0.1 to 1.0 part by weight alkanol for each part by weight of water.

The preferred second stage reaction temperature is about 50° C. up to reflux temperature. A more preferred reaction temperature is about 60°-80° C.

After the adduct has been added to the alkali metal organodithiocarbamate/aqueous alkanol mixture, which is usually completed in about 1-8 hours, the mixture is preferably heated at reflux for about 2-8 hours to assure completion of the reaction.

After the reaction is completed, the product is removed by conventional methods such as by removing alkanol, water washing, vacuum stripping and filtering.

The additives are useful in lubricating oils including both mineral and synthetic oils of viscosity suitable for use in the crankcase of an internal combustion engine.

Mineral oils include those of suitable viscosity refined from crude oil from all sources including Gulfcoasts, Pennsylvania, midcontinent, California, Alaska and the like. Various standard refinery operations can be used in processing the mineral oil.

Synthetic oil includes both hydrocarbon synthetic oil and synthetic esters. Useful synthetic hydrocarbon oils include polymers with alpha-olefins having the proper viscosity. Especially useful are the hydrogenated liquid oligomers of $C_{6-12}$ alpha-olefins such as alpha-decene trimer. Likewise, alkyl benzenes of proper viscosity can be used, such as didodecylbenzene.

Useful synthetic esters include the esters of both monocarboxylic acid and polycarboxylic acid as well as monohydroxy alkanols and polyols. Typical examples are didoceyl adipate, trimethylol propane, tripelargonate, pentaerythritol, tetracaproate, di-(2-ethylhexyl)adipate, dilauryl sebacate and the like. Complex esters prepared from mixtures of mono- and dicarboxylic acid and mono-and polyhydroxy alkanols can also be used.

Blends of mineral oil with synthetic oil are also useful. For example, blends of 5-25 wt. % hydrogenated 1-decene trimer with 75-95 wt. % 150 SUS (100° F.) mineral oil. Likewise, blends of about 5-25 wt. % di-(2-ethylhexyl)adipate with mineral oil of proper viscosity results in a useful lubricating oil.

Also, blends of synthetic hydrocarbon oil with synthetic esters can be used. Blends of mineral oil with synthetic oil are useful when preparing low viscosity oil (e.g. SAE 5 W 20) since they permit the low viscosities without contributing excessive volatility.

Other additives may be included in the oil compositions. These include such additives as zinc dialkyldithiophosphates, barium phenates, calcium phenates, calcium aryl sulfonates, magnesium aryl sulfonates, overbased calcium aryl sulfonates, barium polybutenyl phosphonates; antioxidants such as 4,4'-methylene-bis(2,6-di-tert-butylphenol), alpha-dimethylamino-2,6-di-tert-butyl-p-cresol); dispersants such as polybutenyl succinimides of ethylenepolyamines, polybutenyl ethylenediamines; viscosity index improvers such as polybutenes, ethylene-propylene copolymers, polylauryl methacrylates, and the like.

In this use, the additive product of the invention is added in an amount sufficient to improve the antioxidant property of the lubricant. An amount of 0.1 to 10.0 weight percent is usually sufficient.

In many cases, a preferred way to add the present additives to lubricating oil is in the form of an additive package. These are concentrates dissolved in a diluent such as mineral oil, synthetic hydrocarbon oils and mixtures thereof which, when added to a base oil, will provide an effective concentration of the present additives and other known conventional additives such as those listed above. The various additives are present in a proper ratio such that when a quantity of the concentrate is added to lubricating oil the various additives are all present in the proper concentration. For example, if the desired use level of a particular additive component is 0.2 wt. % and the final formulated oil is made by adding 10 parts of the additive package to 90 parts of base lubricating oil, then the additive pack will contain 2.0 wt. % of that particular additive component. Usually the concentrate will be 0.5 to 1.5 percent by weight additive composition and from 98.5 to 99.95 percent by weight lubricating oil diluent.

The following examples are presented to illustrate the manner in which the additives of the invention can be prepared and are not to be considered as limiting as to any aspect thereof.

EXAMPLE I

Sulfur monochloride, 1.69 moles (228.1 grams), and anhydrous ferric chloride, 1.55 millimoles (0.251 gram) were charged into a suitable reaction flask equipped with a stirrer, thermometer, a condenser maintained at 5° C. and a sub-surface gas sparger. Thereafter, gaseous isobutylene was bubbled into the reaction flask below the surface of the sulfur monochloride containing dissolved ferric chloride while stirring to bring the temperature up to about 60° C. Addition of isobutylene was continued for about 4.0 hours while maintaining the temperature at 60° C. A total of about 170.9 grams (approximately 3.05 moles) of isobutylene was added. The reaction product was a light amber oil that weighed approximately 390.8 grams and represented about 98% recovery of the reactants charged. Analysis showed an addition compound having a refractive index of 25° C. of 1.5300 containing 26.8 weight percent sulfur and 28.3 weight percent chlorine.

A 3-neck, 1.0 liter round bottom flask equipped with an overhead stirrer, condenser, nitrogen inlet, dropping funnel and pyrometer probe was charged with 66.6 grams of 50% aqueous sodium hydroxide, 33.0 grams of water and 93.3 grams of a 40% aqueous solution of dimethylamine. The resulting solution was cooled to about 3°-4° C. by means of an ice bath and 62.1 grams of carbon disulfide were added dropwise to the flask over a period of about fifteen minutes. The solution turned light yellow. Following this, 100 milliliters of isopropanol were added to the flask and the solution was heated to 73°-74° C. and 100 grams of the isobutylene-sulfur monochloride adduct prepared as described above were added dropwise over a period of 30 minutes. The resultant greenish-brown solution was refluxed at 73° C. for 3.0 hours. The flask was then cooled to room temperature and allowed to stand overnight. Following this, the solution was treated with 200 milliliters of methylene chloride and 100 milliliters of water. The resultant mixture was poured into a separatory funnel and shaken. The lower organic layer was collected, filtered and vacuum stripped to give 108.2 grams (63.3% yield) of a dark liquid. Analysis by X-ray fluorescence showed the product to have a sulfur content of 47.1 weight percent and a chlorine content of 0.6 weight percent.

EXAMPLE II

Sulfur monochloride, 1.67 moles (225.9 grams) and anhydrous ferric chloride, about 1.53 millimoles (approximately 0.248 gram) were charged into a suitable reaction flask equipped with a stirrer, thermometer, a condenser maintained at 5 C. and a subsurface gas sparger. Thereafter, gaseous isobutylene was bubbled into the reaction flask below the surface of the sulfur monochloride containing dissolved ferric chloride while stirring to bring the temperature up to about 60° C. Addition of the isobutylene was continued for about 4.0 hours while maintaining the temperature at about 60° C. A total of 169.80 grams (3.02 moles) of isobutylene was added. The reaction product was a clear yellow liquid that weighed 383.83 grams and represented approximately 97.7% recovery of the reactants charged. Analysis showed an addition compound having a refractive index at 25° C. of 1.5304 containing 26.8 weight percent sulfur and 28.0 weight percent chlorine.

A 3-neck, 1.0 liter round bottom flask equipped with an overhead stirrer, condenser, nitrogen inlet, a dropping funnel, and pyrometer probe was charged with 57.52 grams of 50 percent aqueous sodium hydroxide and 127.0 milliliters of water. The solution was cooled to about 10° C. by means of an ice bath and 52.88 grams of diethylamine were added to the solution. The resulting solution was then maintained at 11° C. and 54.77 grams of carbon disulfide were added dropwise to the flask over a period of about 1.0 hour. Following this, 100 milliliters of ethanol were added to the flask and the solution was heated to 66° C. and 100 grams of the isobutylene-sulfur monochloride adduct prepared as described above were added dropwise over a period of 1.5 hours. The solution was refluxed at 80° C. for 1.5 hours. The solution was cooled to room temperature whereupon it was treated with 100 milliliters of methylene chloride and 100 milliliters of water. The resultant mixture was poured into a separatory funnel and shaken. The lower organic layer was collected, filtered and vacuum stripped of solvent to give 130.0 grams (73.0 percent yield) of a brown liquid. Analysis by X-ray fluorescence showed the product to have a sulfur content of 42.3 weight percent and a chlorine content of 0.43 weight percent.

EXAMPLE III

A 4-neck, 1.0 liter round bottom flask, fitted with a heating mantel, a magnetic stirrer, a condenser, a nitrogen inlet, dropping funnel and a pyrometer probe was charged with 200.0 grams (2.5 moles) of 50 percent aqueous sodium hydroxide solution, 100 grams of water, 281.76 grams (2.5 moles) of a 40 percent aqueous solution of dimethylamine, and 190.36 grams (2.5 moles) of carbon disulfide. The carbon disulfide was added over a period of 10 minutes with the temperature of the solution maintained below 35° C. Following this, 300 grams of ethanol were added to the flask and the mixture was then heated to 75° C. and 300.0 grams of an isobutylene-sulfur monochloride adduct prepared in accordance with the teachings of the invention using liquid isobutylene and in the absence of a Lewis acid were added over a period of 20 minutes while the temperature was maintained at about 75° C. Heat was applied and the mixture was refluxed at 83° C. for 4.0 hours.

Most of the ethanol was stripped off in a rotary evaporator. The product was dissolved in methylene chloride, washed with water, dried and stripped in a rotary evaporator. Yield was 357.97 grams (70 percent of theory).

Hot Oil Oxidation Tests were carried out to demonstrate the antioxidant effectiveness of the present additives. In these tests, fully formulated mineral lubricating oil samples were prepared both with and without the additive. The oil was placed in a test cell together with 0.3 cubic centimeters of a catalyst composition prepared by dissolving 6.65 grams of ferric acetylacetonate and 0.6 grams of cupric acetylacetonate in 100 grams of xylene. The cell was heated to 160° C. and dry air blown through the heated oil for 48 hours at a rate of 10 liters/hr. The percent viscosity increase was measured at 40° C. The following results were obtained:

| ADDITIVE | PERCENT VISCOSITY INCREASE |
|---|---|
| None | 124.4 |
| Example 1 (0.31 weight % based on total weight of the oil) | 25.2 |
| Example 2 (0.31 weight % based on total weight of the oil) | 28.6 |

Another Hot Oil Oxidation Test was carried out in a fully formulated mineral lubricating oil sample containing 0.28 weight percent of the additive product of Example III based on the total weight of the sample following the same procedure described above. After 48 hours, the oil sample containing the additive product of Example III showed a 104.7 percent viscosity increase compared to a 236.8 percent viscosity increase for the same mineral lubricating oil sample not containing the additive of Example III.

These results demonstrate that the additive antioxidants of the invention are very effective.

What is claimed:

1. A lubricating oil composition comprising a major proportion of a mineral or synthetic lubricating oil and a minor proportion sufficient to improve its antioxidant properties of at least one lubricating oil additive made by the process of (i) reacting at a temperature of from about 30°-100° C. a sulfur halide selected from sulfur monochloride or sulfur dichloride with an aliphatic monolefin in an amount of about 0.4-1.5 gram moles of monolefin for each 0.3-0.75 gram mole of sulfur halide to produce an adduct, (ii) reacting said adduct in an aqueous alkanol medium at a temperature of about 50° C. up to reflux with an alkali metal salt of an organocarbamodithioic acid having the formula:

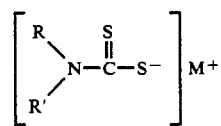

wherein R is an organic radical selected from an alkyl group, an alkenyl group, an aryl group or an aralkyl group in which the alkyl and alkenyl groups contain up to 32 carbon atoms and the aryl and aralkyl groups contain up to 15 carbon atoms and R' is hydrogen or an organic radical selected from an alkyl group, an alkenyl group, an aryl group or an aralkyl group in which the alkyl and alkenyl groups contain up to 32 carbon atoms and the aryl and aralkyl groups contain up to 15 carbon atoms in an amount of from about 0.1 to 0.6 mole of adduct for each mole of alkali metal salt of organocarbamodithioic acid, and (iii) recovering said additive.

2. An additive concentrate adapted for addition to lubricating oil to provide a formulated lubricating oil suitable for use in the crankcase of an internal combustion engine, said concentrate containing a diluent oil and an amount sufficient to improve the antioxidant property of said lubricating oil of at least one oil additive made by the process of (i) reacting at a temperature of from about 30°-100° C. a sulfur halide selected from sulfur monochloride or sulfur dichloride with an aliphatic monolefin in an amount of about 0.4-1.5 gram moles of monolefin for each 0.3-0.75 gram mole of sulfur halide to produce an adduct, (ii) reacting said adduct in an aqueous alkanol medium at a temperature of about 50° C. up to reflux with an alkali metal salt of an organocarbamodithioic acid having the formula:

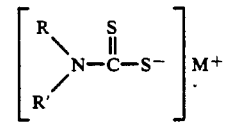

wherein R is an organic radical selected from an alkyl group, an alkenyl group, an aryl group or an aralkyl group in which the alkyl and alkenyl groups contain up to 32 carbon atoms and the aryl and aralkyl groups contain up to 15 carbon atoms and R' is hydrogen or an organic radical selected from an alkyl group, an alkenyl group, an aryl group or an aralkyl group in which the alkyl and alkenyl groups contain up to 32 carbon atoms and the aryl and aralkyl groups contain up to 15 carbon atoms in an amount of from about 0.1 to 0.6 mole of adduct for each mole of alkali metal salt of organocarbamodithioic acid, and (iii) recovering said additive.

3. The composition of claim 1 which contains 0.1 to 10.0 weight percent of said additive.

* * * * *